(12) United States Patent
Tsuchida

(10) Patent No.: US 11,502,561 B2
(45) Date of Patent: Nov. 15, 2022

(54) STATOR, MOTOR, FAN, VACUUM CLEANER, AND HAND DRYER

(71) Applicant: Mitsubishi Electric Corporation, Tokyo (JP)

(72) Inventor: Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 16/957,526

(22) PCT Filed: Jan. 18, 2018

(86) PCT No.: PCT/JP2018/001393
§ 371 (c)(1),
(2) Date: Jun. 24, 2020

(87) PCT Pub. No.: WO2019/142290
PCT Pub. Date: Jul. 25, 2019

(65) Prior Publication Data
US 2021/0226486 A1    Jul. 22, 2021

(51) Int. Cl.
*H02K 1/18* (2006.01)
*H02K 1/14* (2006.01)
(Continued)

(52) U.S. Cl.
CPC ............. *H02K 1/185* (2013.01); *H02K 1/148* (2013.01); *H02K 15/024* (2013.01); *H02K 15/14* (2013.01); *A47K 10/48* (2013.01); *A47L 5/12* (2013.01)

(58) Field of Classification Search
CPC .... H02K 1/148; H02K 1/185; H02K 2201/09; H02K 5/24; A47L 5/12
(Continued)

(56) References Cited

U.S. PATENT DOCUMENTS 6,836,051 B2 * 12/2004 Hiwaki ................. H02K 1/185
310/254.1
7,164,218 B2 * 1/2007 Kimura ................. F04C 23/008
310/58

(Continued)

FOREIGN PATENT DOCUMENTS

EP     3214731 A1    9/2017
JP     H04-325846 A  11/1992
(Continued)

OTHER PUBLICATIONS

Office Action dated May 23, 2022 in connection with counterpart European Patent Application No. 18901452.5.
(Continued)

*Primary Examiner* — Alex W Mok
(74) *Attorney, Agent, or Firm* — Posz Law Group, PLC

(57) ABSTRACT

A stator includes a yoke extending to surround an axis, and having an outer circumference and an inner circumference. The yoke has a crimping portion projecting from the outer circumference, and a split surface provided at a position different from a position of the crimping portion. The yoke has a magnetic path which is provided between the outer circumference and the inner circumference and through which magnetic flux flows. When L1 represents the width of the magnetic path, and L2 represents the width of the yoke including the crimping portion, L1<L2<2.6×L1 is satisfied.

13 Claims, 12 Drawing Sheets

(51) Int. Cl.
  *H02K 15/02* (2006.01)
  *H02K 15/14* (2006.01)
  *A47K 10/48* (2006.01)
  *A47L 5/12* (2006.01)

(58) Field of Classification Search
  USPC ..................................................... 310/40 R
  See application file for complete search history.

(56) References Cited

U.S. PATENT DOCUMENTS

| | | | | |
|---|---|---|---|---|
| 8,258,670 | B2* | 9/2012 | Sakuma | H02K 1/185 |
| | | | | 310/216.118 |
| 2004/0119367 | A1* | 6/2004 | Hiwaki | H02K 1/185 |
| | | | | 310/58 |
| 2004/0124731 | A1* | 7/2004 | Kimura | H02K 1/146 |
| | | | | 310/58 |
| 2012/0139385 | A1 | 6/2012 | Sawada | |
| 2012/0223600 | A1* | 9/2012 | Tonogi | H02K 1/148 |
| | | | | 310/46 |
| 2014/0062249 | A1* | 3/2014 | Nagao | B21D 53/00 |
| | | | | 310/216.089 |
| 2016/0218570 | A1* | 7/2016 | Jang | H02K 9/06 |
| 2016/0241092 | A1* | 8/2016 | Nigo | F04C 18/344 |

FOREIGN PATENT DOCUMENTS

| | | |
|---|---|---|
| JP | H09-331642 A | 12/1997 |
| JP | 2012-222836 A | 11/2012 |
| JP | 2017-180183 A | 10/2017 |
| WO | 2012/057100 A1 | 5/2012 |

OTHER PUBLICATIONS

Japanese Office Action dated Mar. 2, 2021, issued in corresponding JP Patent Application No. 2019-565629 (and English Machine Translation).

International Search Report of the International Searching Authority dated Apr. 3, 2018 for the corresponding International application No. PCT/JP2018/001393 (and English translation).

Extended EP Search Report dated Dec. 17, 2020 issued in corresponding EP patent application No. 18901452.5.

Office Action dated Jan. 17, 2022 in connection with counterpart CN Patent Application No. 201880083436.8 and a machine translation.

\* cited by examiner

STATOR, MOTOR, FAN, VACUUM CLEANER, AND HAND DRYER

CROSS REFERENCE TO RELATED APPLICATION

This application is a U.S. national stage application of International Patent Application No. PCT/JP2018/001393 filed on Jan. 18, 2018, the disclosure of which is incorporated herein by reference.

TECHNICAL FIELD

The present invention relates to a stator, a motor, and a fan, a vacuum cleaner, and a hand dryer including the motor.

BACKGROUND

Generally, a stator of a motor has a stator core obtained by stacking stack elements such as electromagnetic steel sheets and fixing the elements using crimping portions. In order to reduce iron loss, it is desirable to provide the crimping portions at positions where the crimping portions interrupt as little as possible magnetic paths formed in the stator core. Thus, it is proposed to form convex portions on an outer circumference of the stator core and to provide the crimping portions at the convex portions (see, for example, patent reference 1).

PATENT REFERENCE

Patent Reference 1: Japanese Patent Application Publication No. H4-325846 (see FIG. 1)

In recent years, a stator core having a split structure obtained by combining a plurality of split cores is developed. The number of crimping portions in such a stator core having the split structure is larger than that in a stator core having an integrated structure. Thus, it is desired to further enhance the effect of reducing the iron loss.

SUMMARY

The present invention is made to solve the above-described problem, and an object of the present invention is to enhance the effect of reducing the iron loss in a stator core.

A stator according to the present invention includes a yoke extending to surround an axis and having an outer circumference and an inner circumference, the yoke having a crimping portion projecting from the outer circumference and a split surface provided at a position different from the position of the crimping portion. The yoke has a magnetic path which is provided between the outer circumference and the inner circumference and through which magnetic flux flows. When L1 represents a width of the magnetic path, and L2 represents a width of the yoke including the crimping portion, $L1<L2<2.6\times L1$ is satisfied.

A stator according to the present invention includes a yoke extending to surround an axis, the yoke having a first yoke portion and a second yoke portion arranged in a circumferential direction about the axis. Each of the first yoke portion and the second yoke portion has an outer circumference and an inner circumference. The yoke has a crimping portion projecting from the outer circumference of the second yoke portion, and a split surface provided on the first yoke portion or the second yoke portion at a position different from the position of the crimping portion. The distance from the axis to the outer circumference of the first yoke portion is greater than the distance from the axis to the outer circumference of the second yoke portion.

According to the present invention, the width L1 of the magnetic path of the yoke and the width L2 of the yoke including the crimping portion satisfy $L1<L2<2.6\times L1$. This makes it possible to suppress the influence of the crimping portion on magnetic flux flowing through the magnetic path and to enhance the effect of reducing the iron loss. Moreover, the crimping portion is provided at an outer circumference of the second yoke portion. A distance from the axis to the outer circumference of the second yoke portion is smaller of the first yoke portion and the second yoke portion. This makes it possible to reduce an external force applied to the crimping portion, and to enhance the effect of reducing the iron loss.

DETAILED DESCRIPTION

Embodiments of the present invention will be described in detail below with reference to the drawings. In this regard, these embodiments do not limit the present invention.

Embodiment 1

(Configuration of Motor 100)

Figure 1:
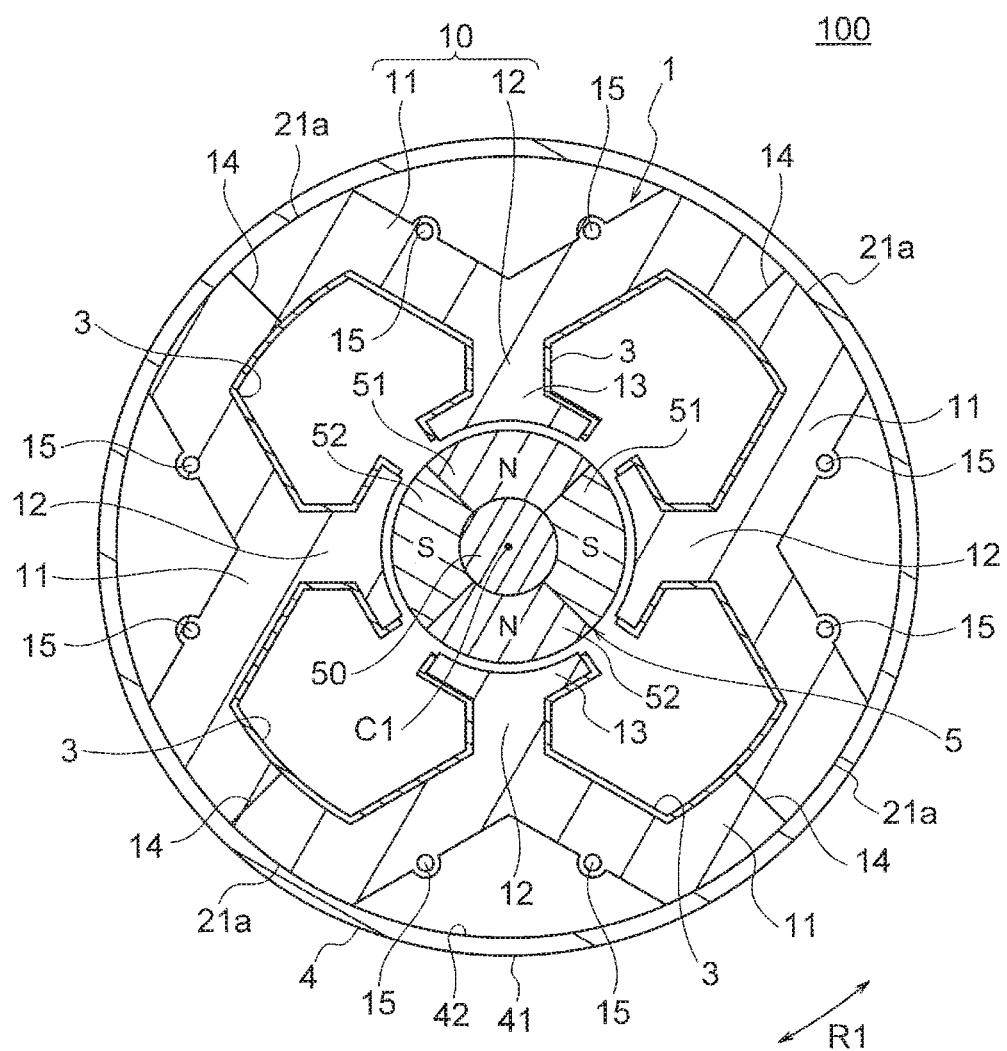
FIG. 1 is a sectional view illustrating a motor according to Embodiment 1.

FIG. 1 is a sectional view illustrating a motor 100 according to Embodiment 1 of the present invention. The motor 100 is a permanent magnet synchronous motor and is a single-phase motor driven by an inverter. The motor 100 is used in a fan 110 (see FIG. 17) in a vacuum cleaner, a hand dryer or the like.

The motor 100 includes a rotor 5 having a shaft 50, and a stator 1 provided to surround the rotor 5. The stator 1 is fixed to an inner side of a metal cylindrical shell 4. The shell 4 has an outer circumference 41 and an inner circumference 42, and the stator 1 is fitted to the inner circumference 42.

Hereinafter, a direction of an axis C1 serving as a center of rotation of the shaft 50 will be referred to as an "axial direction". A circumferential direction (indicated by an arrow R1 in FIG. 1 or the like) about the axis C1 of the shaft 50 will be referred to as "circumferential direction". A radial direction about the axis C1 of the shaft 50 will be referred to as a "radial direction". A sectional view taken along a plane parallel to the axial direction will be referred to as a "longitudinal sectional view".

The rotor 5 includes the shaft 50, and permanent magnets 51 and 52 fixed to a periphery of the shaft 50. The permanent magnets 51 and 52 are arranged at equal intervals in the circumferential direction, and each of the permanent magnets 51 and 52 forms a magnetic pole. Outer circumferential surfaces of the permanent magnets 51 are, for example, north poles, and outer circumferential surfaces of the permanent magnets 52 are, for example, south poles, but the magnetic poles may be reversed.

In this example, two permanent magnets 51 and two permanent magnets 52 are alternately arranged in the circumferential direction. In other words, the rotor 5 has four magnetic poles. However, the number of magnetic poles of the rotor 5 is not limited to four. It is sufficient that the number of magnetic poles of the rotor 5 is two or more.

The stator 1 is disposed on an outer side of the rotor 5 in the radial direction via an air gap. The stator 1 includes a stator core 10, insulating portions 3, and coils (for example, coils 35 illustrated in FIG. 17).

The stator core 10 is obtained by stacking a plurality of stack elements in the axial direction and fixing the stack elements together using crimping portions 15. In this example, the stack elements are electromagnetic steel sheets, and each of the electromagnetic steel sheet has a thickness of, for example, 0.25 mm.

The stator core 10 includes a yoke 11 surrounding the rotor 5, and a plurality of teeth 12 extending from the yoke 11 toward the rotor 5 (that is, inward in the radial direction). The teeth 12 are arranged at equal intervals in the circumferential direction. The number of teeth 12 is equal to that of magnetic poles of the rotor 5, and is four in this example. However, it is sufficient that the number of teeth 12 is two or more. The teeth 12 have tooth ends 13 facing the rotor 5. Each tooth end 13 is formed to have a length in the circumferential direction larger than other portions of the tooth 12.

Slots are each formed between two teeth 12 adjacent to each other in the circumferential direction in the stator core 10. An insulating portion 3 made of an insulating resin is disposed in each slot. Each insulating portion 3 is formed to cover, for example, a wall surface of the yoke 11 on the inner circumferential side, two end surfaces of the tooth 12 in the circumferential direction, and two end surfaces of the tooth 12 in the axial direction.

The insulating portions 3 are formed by integrally molding a resin with the stator core 10, or fitting a resin compact molded as a separate component to the stator core 10. The coils (for example, the coils 35 illustrated in FIG. 17) are wound around the teeth 12 via the insulating portions 3. The insulating portions 3 insulate the stator core 10 and the coils from each other.

Figure 2:
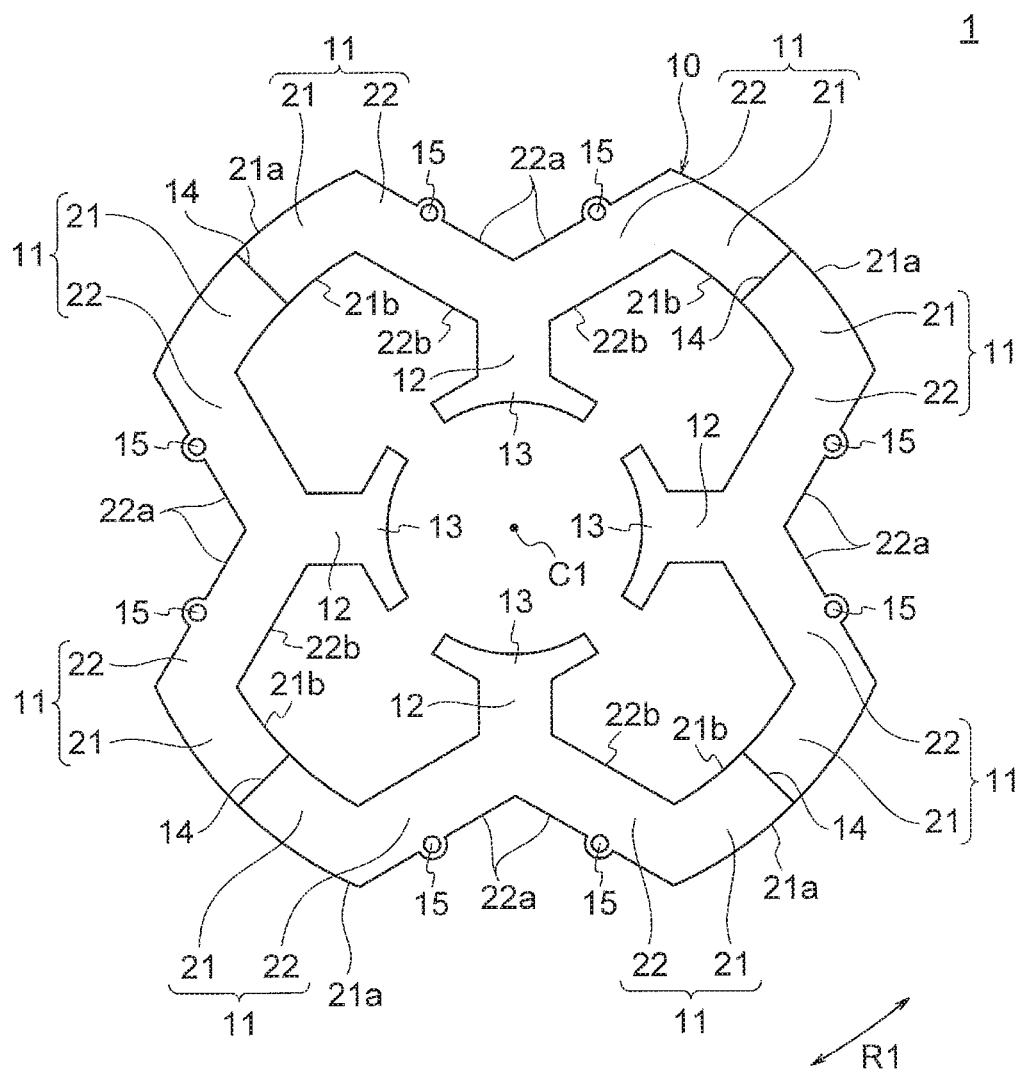
FIG. 2 is a plan view illustrating a stator according to Embodiment 1.

FIG. 2 is a plan view illustrating the stator core 10. The yoke 11 of the stator core 10 includes first yoke portions 21 and second yoke portions 22 arranged in the circumferential direction. The first yoke portions 21 and the second yoke portions 22 are alternately arranged in the circumferential direction.

The first yoke portions 21 are outermost portions of the stator 1 in the radial direction, and extend in arc shapes about the axis C1. The first yoke portions 21 are arranged at equal intervals in the circumferential direction. The number of first yoke portions 21 is equal to the number of teeth 12, and is four in this example.

Each first yoke portion 21 has an outer circumference 21a located on an outer side in the radial direction, and an inner circumference 21b located on an inner side in the radial direction. The outer circumferences 21a of the first yoke portions 21 engage with a cylindrical inner circumference 42 of the shell 4 (FIG. 1). The inner circumferences 21b of the first yoke portions 21 face the above-described slots.

The second yoke portions 22 are each located between first yoke portions 21 adjacent to each other in the circumferential direction. Each second yoke portion 22 has a shape such that linear portions are combined in a V-shape. The linear portions extend from ends of the first yoke portions 21 and inclined inward in the radial direction with respect to the circumferential direction. Each tooth 12 extends from an innermost portion of the second yoke portion 22 in the radial direction, that is, an apex portion of the V shape. The number of second yoke portions 22 is equal to the number of teeth 12, and is four in this example.

Each second yoke portion 22 has an outer circumference 22a and an inner circumference 22b. The second yoke portions 22 are located at an inner side with respect to the first yoke portions 21 in the radial direction about the axis C1. In other words, the distance from the axis C1 to the outer circumference 22a of the second yoke portion 22 is smaller than the distance from the axis C1 to the outer circumference 21a of the first yoke portion 21. Therefore, the outer circumferences 21a of the first yoke portions 21 abut against the shell 4 (FIG. 1), while the outer circumferences 22a of the second yoke portions 22 do not abut against the shell 4. The inner circumferences 22b of the second yoke portions 22 face the above-described slots.

Split surfaces 14 are formed at centers of the first yoke portions 21 in the circumferential direction. The stator core 10 is divided into split cores 2 (FIG. 3), each for one tooth 12, at the split surfaces 14 formed on the first yoke portions 21. In this example, the stator core 10 is divided into four split cores 2. The split surfaces 14 are flat surfaces (illustrated as straight lines in FIG. 2) in this example, but the split surfaces 14 may be provided with convex portions or concave portions.

The stator core 10 is fixed integrally by the crimping portions 15. The crimping portions 15 are formed to project outward from the outer circumferences 22a of the second yoke portions 22. Each crimping portion 15 is located between the tooth 12 and the split surface 14 in the circumferential direction.

Magnetic flux from the permanent magnet 51 (north pole) of the rotor 5 illustrated in FIG. 1 flows through each tooth 12 outward in the radial direction, flows into the yoke 11, and flows through the yoke 11 in a direction from the second yoke portion 22 toward the first yoke portion 21. Magnetic flux directed toward the permanent magnet 52 (south poles) of the rotor 5 flows through the yoke 11 in a direction from the first yoke portion 21 toward the second yoke portion 22, flows into the tooth 12, and flows through the tooth 12 inward in the radial direction.

Thus, magnetic paths which are paths for the magnetic flux are formed in the yoke 11 and the teeth 12. In the yoke 11, a region between the outer circumference 22a and the inner circumference 22b of the second yoke portion 22, and a region between the outer circumference 21a and the inner circumference 21b of the first yoke portion 21 serve as the magnetic paths.

(Arrangement of Crimping Portions 15)

Figure 3:
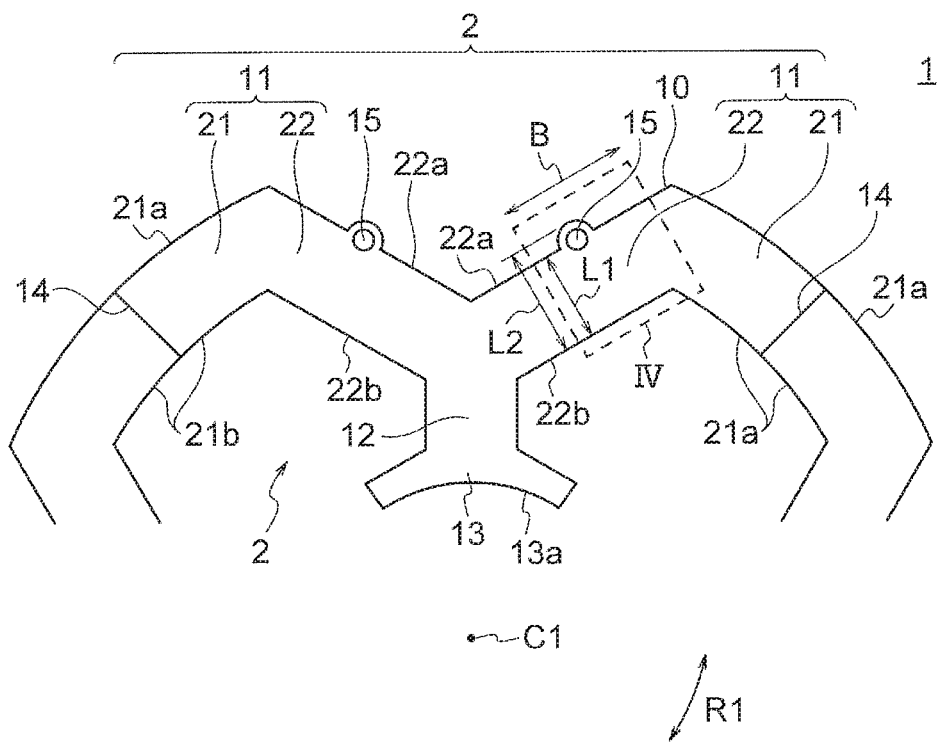
FIG. 3 is an enlarged view illustrating a part of the stator according to Embodiment 1.
Figure 4:
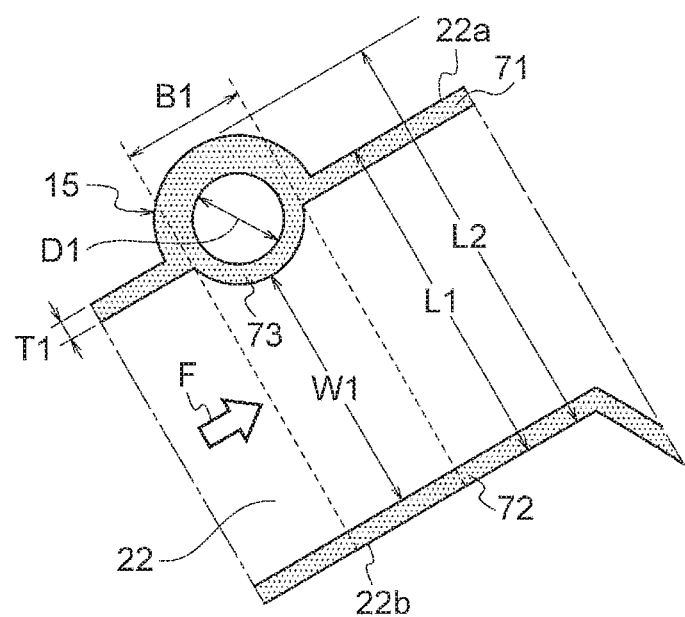
FIG. 4 is an enlarged view illustrating a portion of the stator where a crimping portion is formed according to Embodiment 1.

FIG. 3 is an enlarged view illustrating a part of the stator core 10. FIG. 4 is an enlarged view illustrating a portion surrounded by a broken line IV in FIG. 3. The crimping portion 15 projects outward from the outer circumference 22a of the second yoke portion 22 of the yoke 11 as described above.

That is, the crimping portion 15 projects outside the magnetic path of the second yoke portion 22. It is most desirable that the entire crimping portion 15 is located outside the magnetic path, but it is sufficient that at least a part of the crimping portion 15 is located outside the magnetic path as illustrated in FIG. 3.

A width of the second yoke portion 22 (that is, a distance from the inner circumference 22b to the outer circumference 22a) is defined as a width L1. The width L1 corresponds to a width of the magnetic path in the second yoke portion 22, and accordingly is also referred to as a magnetic path width.

In contrast, a width of the second yoke portion 22 including the crimping portion 15 is defined as a width L2. The width L2 is a distance from the inner circumference 22b of the second yoke portion 22 to a most projecting portion of the crimping portion 15, and accordingly is also referred to as a maximum width. Both of the widths L1 and L2 are dimensions in a direction perpendicular to a direction in which magnetic flux flows. In the example illustrated in FIGS. 3 and 4, the widths L1 and L2 are dimensions in a direction perpendicular to a direction in which the second yoke portion 22 extends.

In this example, the magnetic path width L1 and the maximum width L2 are set to satisfy L1<L2<L1×2.6. Since the crimping portion 15 projects outward from the outer circumference 22a of the second yoke portion 22, the maximum width L2 is larger than the magnetic path width L1 (that is, L1<L2 is satisfied). In addition, when L2<L1×2.6 is satisfied, the influence of stress at the crimping portion 15 and the like on the magnetic flux flowing through the second yoke portion 22 decreases, and thus iron loss is reduced as will be described later.

The magnetic path width L1 is, for example, 2.8 mm, and the maximum width L2 is set to satisfy L1<L2<L1×2.6, as described above. In this regard, FIG. 4 is an enlarged view illustrating a region of the second yoke portion 22 illustrated in FIG. 3, and the region has a length B (for example, 6 mm) in the direction in which magnetic flux flows.

(Function)

Figure 5:
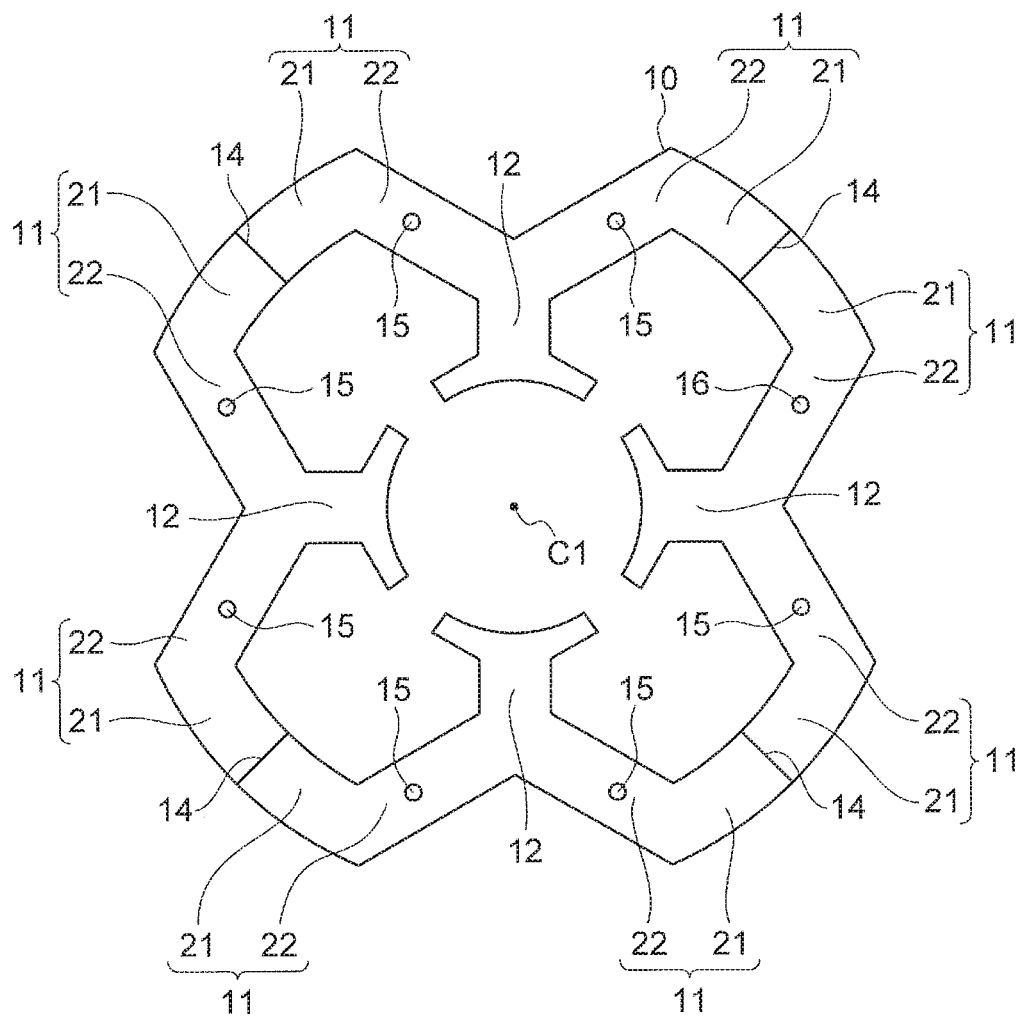
FIG. 5 is a plan view illustrating a stator according to a Comparative Example.
Figure 6:
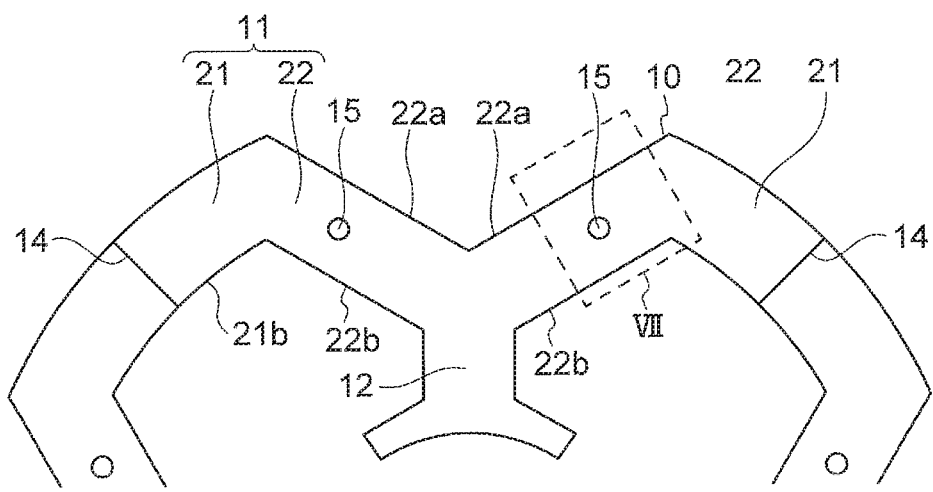
FIG. 6 is an enlarged view illustrating a part of the stator according to the Comparative Example.

The function of Embodiment 1 will be described next in comparison with a Comparative Example. FIG. 5 is a plan view illustrating a stator core 10 according to the Comparative Example, and FIG. 6 is an enlarged view illustrating a part of the stator core 10 according to the Comparative Example. For the sake of descriptive convenience, portions of the stator core according to the Comparative Example are assigned with the same reference numerals as those of the stator core 10 according to Embodiment 1.

As illustrated in FIGS. 5 and 6, in the stator core 10 according to the Comparative Example, each crimping portion 15 is formed at the center of the second yoke portion 22 of the yoke 11 in the widthwise direction, that is, the center of the magnetic path. The stator core 10 according to the Comparative Example is configured in the same manner as the stator core 10 according to Embodiment 1, except for the arrangement of the crimping portions 15.

The stator core 10 is generally formed by stacking a plurality of electromagnetic steel sheets punched by pressing, and fixing the sheets together using crimping portions. In a punching process and a crimping process, stress (more specifically, shear stress) is applied to machining surfaces of the electromagnetic steel sheets. Magnetic characteristic of portions subjected to the stress degrades, and the iron loss increases when the magnetic flux passes through these portions.

Figure 7:
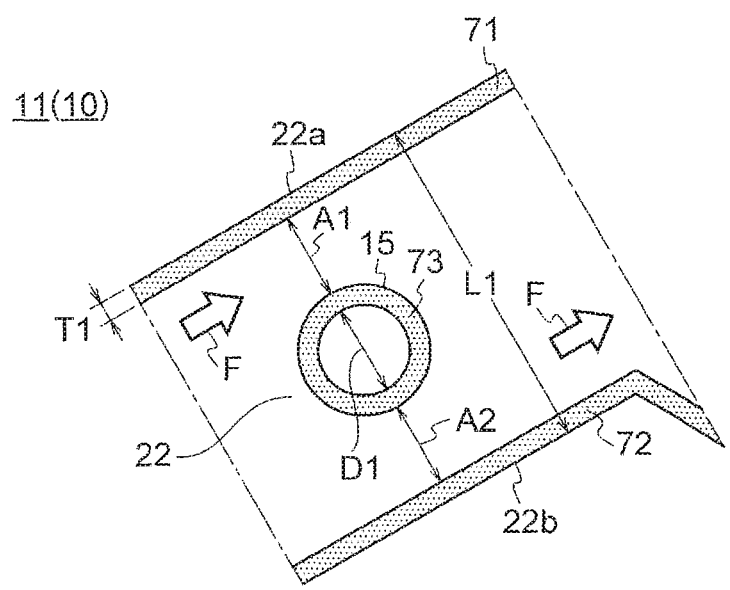
FIG. 7 is an enlarged view illustrating a portion of the stator where a crimping portion is formed according to the Comparative Example.

FIG. 7 is an enlarged view illustrating a portion surrounded by a broken line VII in FIG. 6. In the second yoke portion 22 of the stator core 10, portions 71 and 72 subjected to the stress in the punching process are present along the outer circumference 22a and the inner circumference 22b. A portion 73 subjected to the stress in the crimping process is also present along an outer circumference of the crimping portion 15.

The portions 71, 72, and 73 which are subjected to the stress are referred to as stress-applying portions. A width of each of the stress-applying portions 71, 72, and 73 is equal to the thickness T1 of the electromagnetic steel sheet. In FIG. 7, the stress-applying portions 71, 72, and 73 are indicated by hatching.

The magnetic flux in the second yoke portion 22 flows in the direction in which the second yoke portion 22 extends, that is, a direction indicated by arrows F. Magnetic paths in the second yoke portion 22 subjected to no stress include a portion having a width A1 from the outer circumference 22a to the crimping portion 15, and a portion having a width A2 from the inner circumference 22b to the crimping portion 15.

Since the width (that is, the magnetic path width) of the second yoke portion 22 is defined as L1, the width A (=A1+A2) of the magnetic path subjected to no stress is expressed by the following equation:

$$A = L1 - T1 \times 4 - D1 \tag{1}$$

where D1 is a diameter of the crimping portion 15.

As the width A of the magnetic path subjected to no stress increases, the iron loss can be reduced. However, there is a limit in reducing the thickness T1 of the electromagnetic steel sheet and the diameter D1 of the crimping portion 15. Moreover, when the width L1 increases, the size of the stator 1 increases.

In contrast, in Embodiment 1, the crimping portion 15 projects from the outer circumference 22a of the second yoke portion 22, as illustrated in FIG. 4. Even in this Embodiment 1, as in the Comparative Example, the stress-applying portions 71 and 72 are present along the outer circumference 22a and the inner circumference 22b, and the stress-applying portion 73 is present along the outer circumference of the crimping portion 15. In this regard, on the outer circumferential side of the crimping portion 15, the stress-applying portions 71 and 73 are combined to have a width of 2×T1.

As described above, when L2 represents the maximum width of the second yoke portion 22 (that is, the distance from the inner circumference 22b of the second yoke portion 22 to the most projecting portion of the crimping portion 15), the width W1 of the magnetic path subjected to no stress in the second yoke portion 22 is expressed by the following equation:

$$W1 = L2 - T1 \times 4 - D1 \qquad (2)$$

A comparison between the equations (1) and (2) indicates that the width W1 of the magnetic path in Embodiment 1 is larger by (L2−L1) than the width A of the magnetic path in the Comparative Example. This makes it possible to increase the amount of magnetic flux flowing through the magnetic path subjected to no stress, and to reduce the iron loss.

A width ratio L2/L1 representing a ratio of the maximum width L2 to the magnetic path width L1 of the second yoke portion 22 will be described next. In this example, the magnetic path width L1 is set to 2.8 mm, the diameter D1 of the crimping portion 15 is set to 1 mm, the thickness T1 of the electromagnetic steel sheet is set to 0.25 mm, and the maximum width L2 is changed from 2.8 mm to 7.3 mm. The width W1 of the magnetic path is set to 0.8 mm when the magnetic path width L1 and the maximum width L2 are both 2.8 mm.

Figure 8:
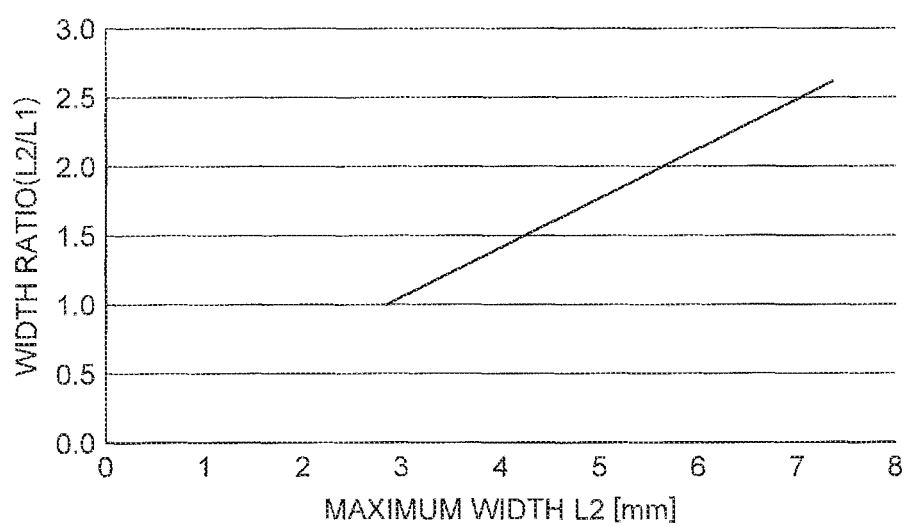
FIG. 8 is a graph illustrating a relationship between a maximum width L2 of a yoke and a width ratio L2/L1.

FIG. 8 is a graph illustrating a relationship between the maximum width L2 and the width ratio L2/L1. As illustrated in FIG. 8, the width ratio L2/L1 is changed from 1 to 2.6 by setting the magnetic path width L1 to 2.8 mm and changing the maximum width L2 is changed from 2.8 mm to 7.3 mm, and a change in iron core efficiency is examined by analysis.

Figure 9:
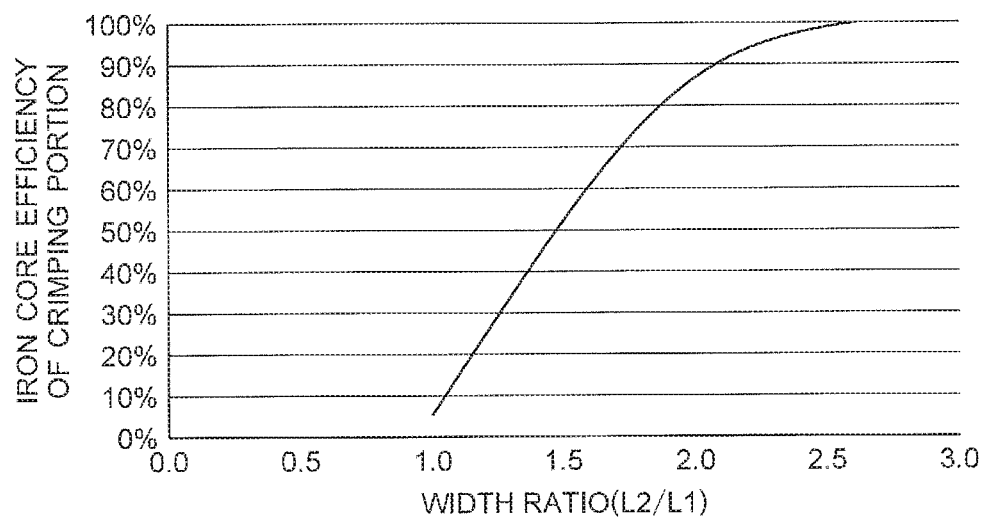
FIG. 9 is a graph illustrating a relationship between the width ratio L2/L1 and an iron core efficiency of the crimping portion.

FIG. 9 is a graph illustrating a relationship between the width ratio L2/L1 and the iron core efficiency. The iron core efficiency means a ratio of the magnetic flux flowing through the magnetic path subjected to no stress (having the magnetic path width W1) to the magnetic flux flowing through the second yoke portion 22 having the maximum width L2.

FIG. 9 indicates that, as the width ratio L2/L1 increases, the iron core efficiency increases. This is because, as the width ratio L2/L1 increases, the amount of projection of the crimping portion 15 from the outer circumference 22a of the second yoke portion 22 increases, and the width W1 of the magnetic path subjected to no stress increases.

FIG. 9 also indicates that, when the width ratio L2/L1 reaches 2.6, the iron core efficiency reaches 100%. When the width ratio L2/L1 is 2.6, the maximum width L2 is 7.3 mm for the magnetic path width L1=2.8 mm, and the width W1 of the magnetic path W1 is 5.3 mm. As the width W1 of the magnetic path subjected to no stress increases, the magnetic flux flowing through the magnetic path is less likely to be influenced by stress, and thus the iron core efficiency is enhanced.

Figure 10:
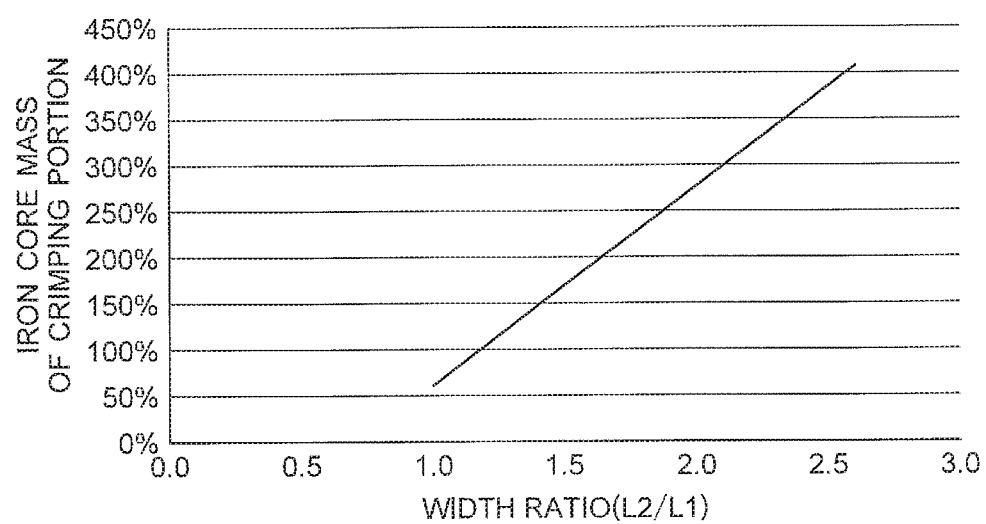
FIG. 10 is a graph illustrating a relationship between the width ratio L2/L1 and an iron core mass of the crimping portion.

FIG. 10 is a graph representing a relationship between the width ratio L2/L1 and the iron core mass of a region including the crimping portion 15. The "iron core mass of a region including the crimping portion 15" means a mass of a region of the second yoke portion 22 having a length B1 in the direction along the magnetic path (that is, a length in a direction perpendicular to L1 and L2) as illustrated in FIG. 4. The iron core mass of the region including the crimping portion 15 is referred to as the iron core mass of the crimping portion hereinafter, for the sake of simplicity.

The length B1 is 1.5 mm in this example. This length corresponds to a sum of the diameter D1 of the crimping portion 15 of 1 mm and double the thickness T1 of the electromagnetic steel sheet of 0.25 mm on both sides of the crimping portion 15. The iron core mass of the crimping portion is expressed as a relative value with respect to the iron core mass (reference value) when the width ratio L2/L1 is 1.2 (L1=2.8 mm and L2=3.3 mm), and the relative value is expressed as 100%.

FIG. 10 indicates that, as the width ratio L2/L1 increase, the iron core mass of the crimping portion increases. This is because as the width ratio L2/L1 increases, the amount of projection of the crimping portion 15 from the outer circumference 22a of the second yoke portion 22 increases, and the size of an extended portion of the second yoke portion 22 on the outer circumference 22a side increases.

Figure 11:
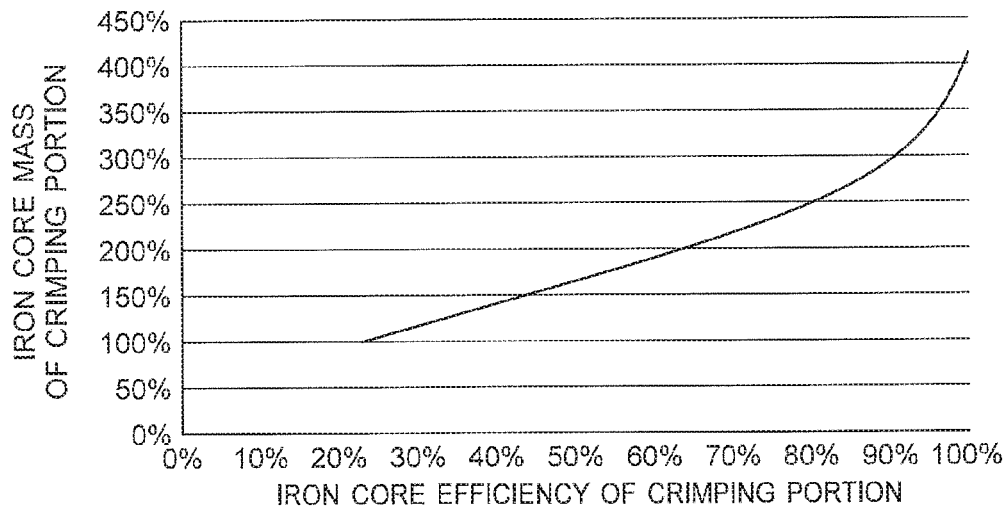
FIG. 11 is a graph illustrating a relationship between the iron core efficiency and the iron core mass of the crimping portion.

FIG. 11 is a graph illustrating a relationship between the iron core efficiency and the iron core mass of the crimping portion, which is obtained from the results illustrated in FIGS. 9 and 10. FIG. 11 indicates that, as the iron core efficiency increases, the iron core mass of the crimping portion also increases. In order to reduce a weight of the motor 100, it is desirable that the iron core mass of the crimping portion is smaller.

As described above, the iron core efficiency reaches 100% when the width ratio L2/L1 is 2.6. Accordingly, in a range of 1<(L2/L1)<2.6, it is desirable to select a width ratio L2/L1 so as to make the iron core efficiency as high as possible and to make the iron core mass of the crimping portion as low as possible.

Figure 12:
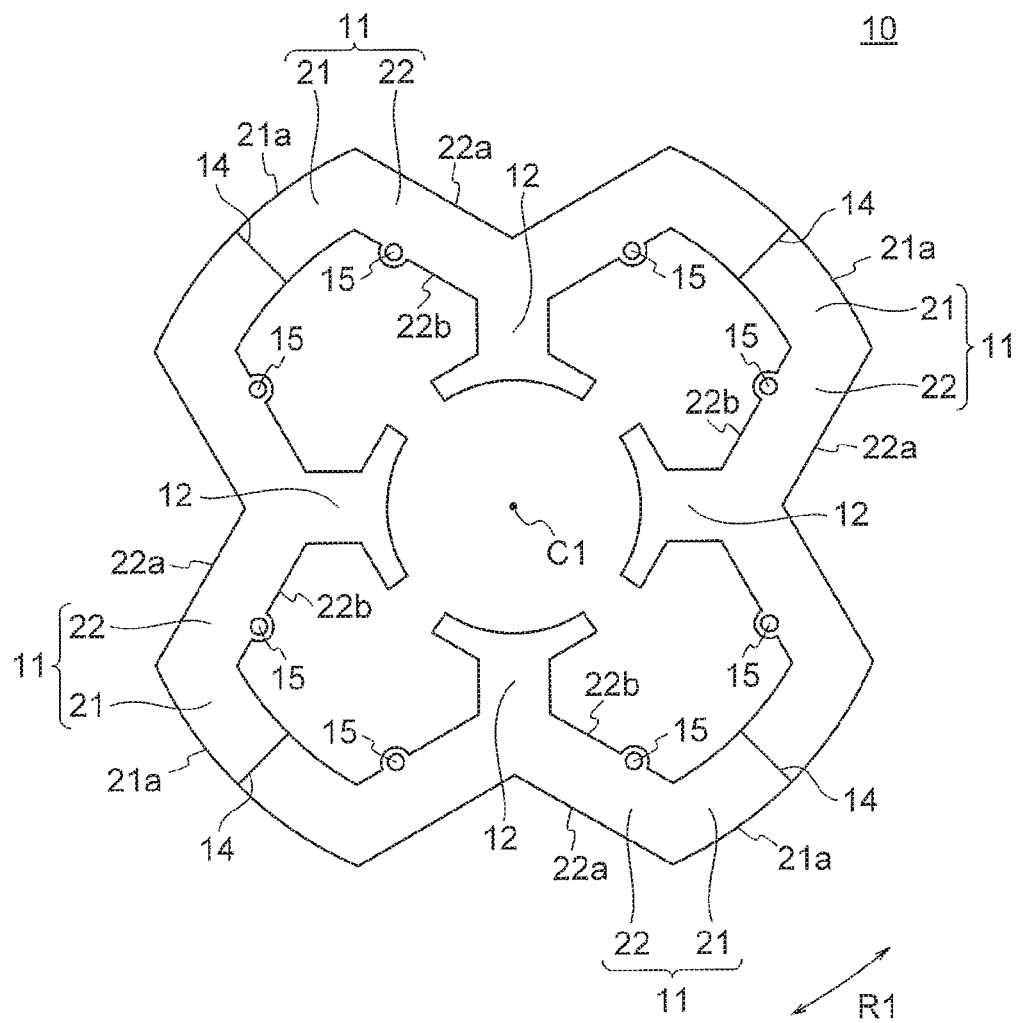
FIG. 12 is a plan view illustrating a stator according to a Comparative Example.

The function and effect obtained by providing the crimping portions 15 on the outer circumferences 22a of the second yoke portions 22 will be described next. FIG. 12 is a plan view illustrating a stator core 10 according to another Comparative Example. For the sake of descriptive convenience, portions of the stator core according to the Comparative Example in FIG. 12 are assigned with the same reference numerals as those of the stator core 10 according to Embodiment 1.

In the stator core 10 illustrated in FIG. 12, crimping portions 15 are formed to project from the inner circumferences 22b of the second yoke portions 22. Even with this configuration, it is possible to increase the width of the magnetic path subjected to no stress. However, in the case where the crimping portions 15 project from the inner circumferences 22b of the second yoke portions 22, it is difficult to wind coils in the slots, and the coil space factor thus decreases. In addition, since the outer circumferences 21a of the first yoke portions 21 fit into the shell 4 are distanced from the crimping portions 15, gaps may be formed in the stacking direction between the electromagnetic steel sheets on the outer circumferences 21a side.

In contrast, in this Embodiment 1, since the crimping portion 15 is provided on the outer circumference 22a of the second yoke portion 22, it is possible to suppress the formation of gaps between the electromagnetic steel sheets on the outer circumference 21a side of the first yoke portion 21. This makes it possible to enhance the position accuracy of the axis of rotation of the motor 100.

The function and effect obtained by providing the crimping portions 15 not on the first yoke portions 21 but on the second yoke portions 22 will be described next. As described above, since the outer circumferences 21a of the first yoke portions 21 are fitted to the shell 4, stress from the shell 4 is applied to the crimping portions 15 in the case where the crimping portions 15 are provided on the outer circumferences 21a of the first yoke portions 21. Therefore, the crimping portions 15 are subjected to the stress from the shell 5 in addition to the stress applied during the punching process and the crimping process, and this leads to a further increase in the iron loss.

In contrast, in this Embodiment 1, the crimping portions 15 are not provided on the first yoke portions 21 but are provided on the second yoke portions 22. Thus, the stress from the shell 4 is not applied to the crimping portions 15. Therefore, the effect of reducing the iron loss can be enhanced.

Effects of Embodiment 1

As described above, in the stator 1 according to Embodiment 1, the crimping portion 15 is provided to project from the outer circumference 22a of the second yoke portion 22 of the yoke 11, and the width L1 of the magnetic path formed between the outer circumference 22a and the inner circumference 22b of the second yoke portion 22, and the width L2 of the second yoke portion 22 including the crimping portion 15 satisfy L1<L2<2.6×L1. Therefore, the magnetic flux flowing through the magnetic paths is less likely to be influence by the stress at the crimping portions 15. Thus, the iron loss can be reduced.

In particular, since the stator 1 has the split structure in which the stator 1 is divided at the split surfaces 14, and the number of crimping portions 15 is larger than the number of crimping portions in a stator having an integrated structure. Thus, the effect of reducing the iron loss can be enhanced by providing the crimping portions 15 as described above.

In Embodiment 1, since the crimping portion 15 projects from the outer circumference 22a of the second yoke portion 22, the crimping portion 15 has no influence on winding of the coils, and a reduction in coil space factor can be suppressed.

In Embodiment 1, the crimping portion 15 is provided between the tooth 12 and the split surface 14 in the circumferential direction. Thus, it is possible to suppress the formation of the gaps between the electromagnetic steel sheets even when an external force is applied to the split surface 14.

In Embodiment 1, the distance from the axis C1 to the outer circumference 22a of the second yoke portion 22 is shorter than the distance from the axis C1 to the outer circumference 21a of the first yoke portion 21, and the crimping portion 15 is provided on the second yoke portion 22. Thus, even when the stator 1 is fitted into the shell 4, the stress from the shell 4 is not applied to the crimping portions 15, and therefore the effect of reducing the iron loss can be enhanced.

Embodiment 2

Figure 13:
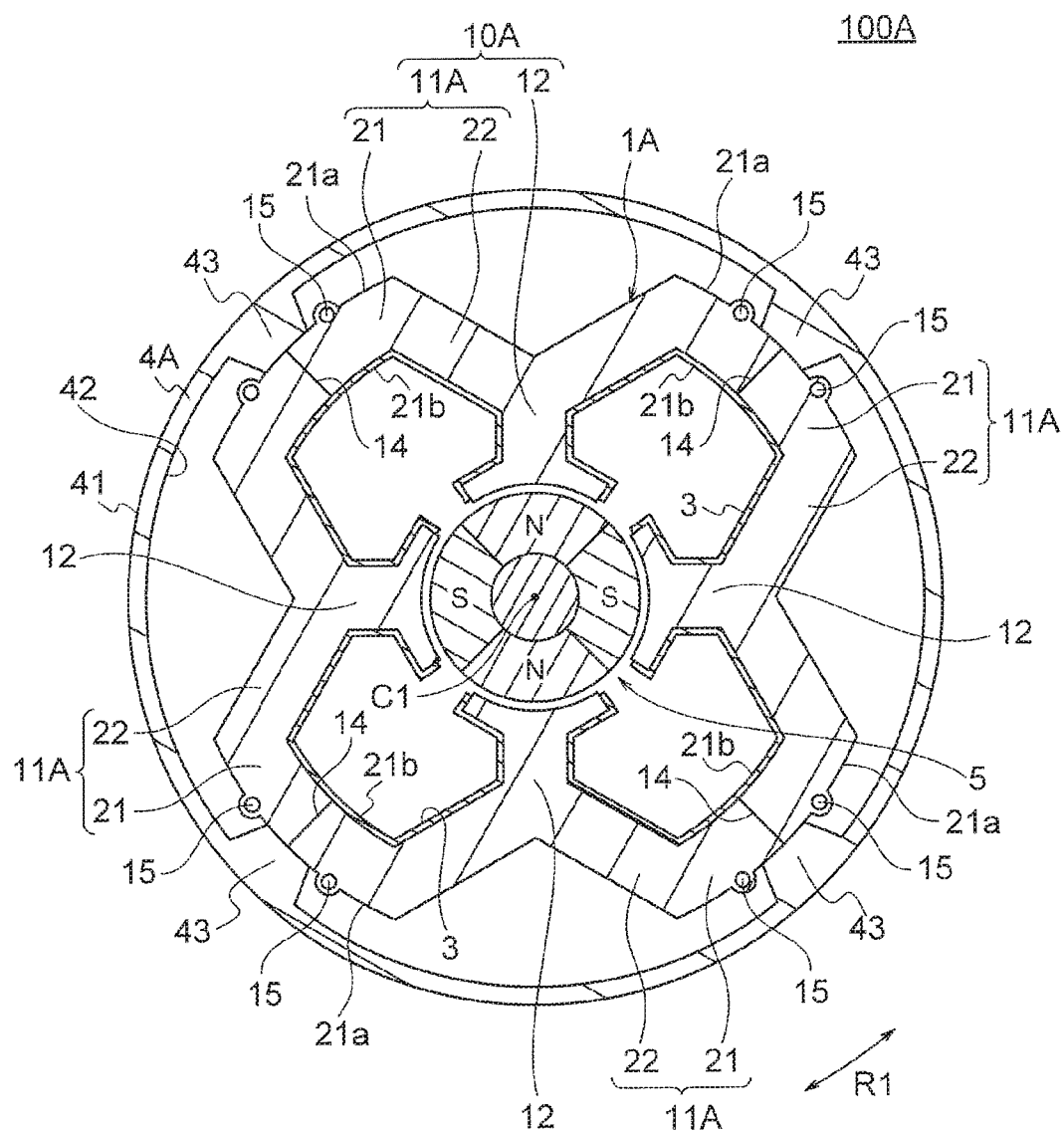
FIG. 13 is a sectional view illustrating a motor according to Embodiment 2.
Figure 14:
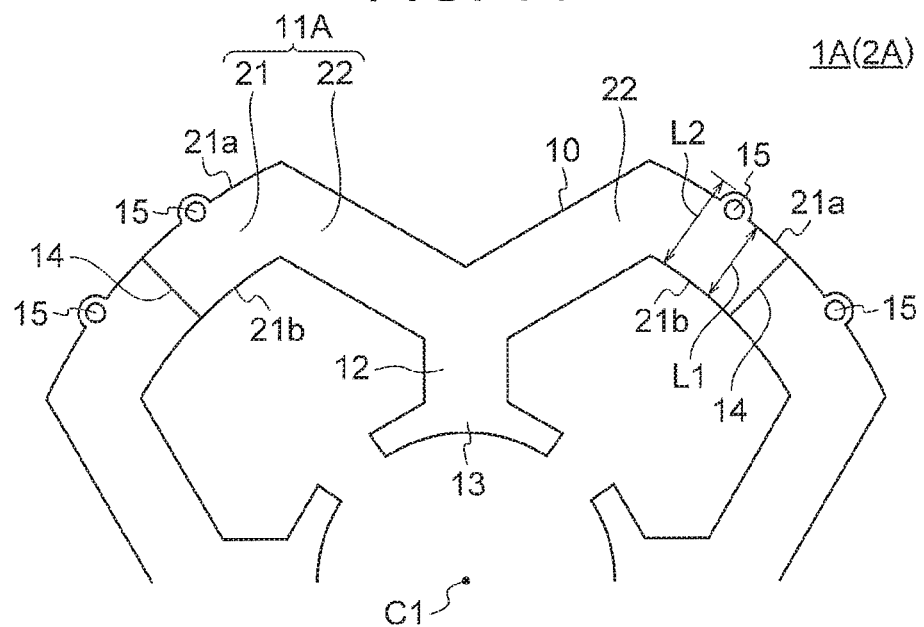
FIG. 14 is an enlarged view illustrating a part of a stator according to Embodiment 2.

Embodiment 2 of the present invention will be described next. FIG. 13 is a sectional view illustrating a motor 100A according to Embodiment 2. FIG. 14 is an enlarged sectional view illustrating a part of a stator 1A of the motor 100A according to Embodiment 2.

The motor 100A according to Embodiment 2 is different from the motor 100 according to Embodiment 1 in that the stator 1A includes crimping portions 15 which are not provided on second yoke portions 22 but are provided on outer circumferences 21a of first yoke portions 21.

Two crimping portions 15 are formed on the outer circumference 21a of each first yoke portion 21 so that the two crimping portions 15 sandwich the split surface 14. When L1 represents the width of the magnetic path (magnetic path width) formed between the outer circumference 21a and the inner circumference 21b of the first yoke portion 21, and L2 represents the width of the first yoke portion 21 including the crimping portion 15 (maximum width), $$L1<L2<2.6\times L1$$

is satisfied.

The motor 100A further includes a shell 4A into which the stator core 10A is fitted. The shell 4A includes abutting portions 43 projecting from an inner circumference 42 thereof toward the first yoke portions 21. The number of abutting portions 43 is equal to the number of first yoke portions 21 of a yoke 11A. Each abutting portion 43 abuts against a portion of the outer circumference 21a of the first yoke portion 21 between the two crimping portions 15. The abutting portion 43 is also referred to as a projecting portion. Other structures of the motor 100A according to Embodiment 2 are the same as those of the motor 100 according to Embodiment 1.

In this Embodiment 2, the crimping portions 15 are provided on the outer circumferences 21a of the first yoke portions 21, but the abutting portions 43 of the shell 4A abut against portions of the outer circumferences 21a of the first yoke portions 21 other than the crimping portions 15. Therefore, the stress from the shell 4A is not applied to the crimping portions 15, and the influence of the stress on the magnetic flux flowing through the magnetic paths can thus be suppressed. Thus, the effect of reducing the iron loss can be enhanced.

In this Embodiment 2, each crimping portion 15 is disposed at a position closer to the split surface 14 than in Embodiment 1, and thus it is possible to enhance the effect of suppress the formation of gaps between the electromagnetic steel sheets due to an external force applied to the split surface 14.

Since the width L1 of the magnetic path formed between the outer circumference 21a and the inner circumference 21b of the first yoke portion 21, and the width L2 of the first yoke portion 21 including the crimping portion 15 satisfy L1<L2<2.6×L1, the effect of reducing the iron loss can be enhanced as in Embodiment 1.

Embodiment 3

Figure 15:
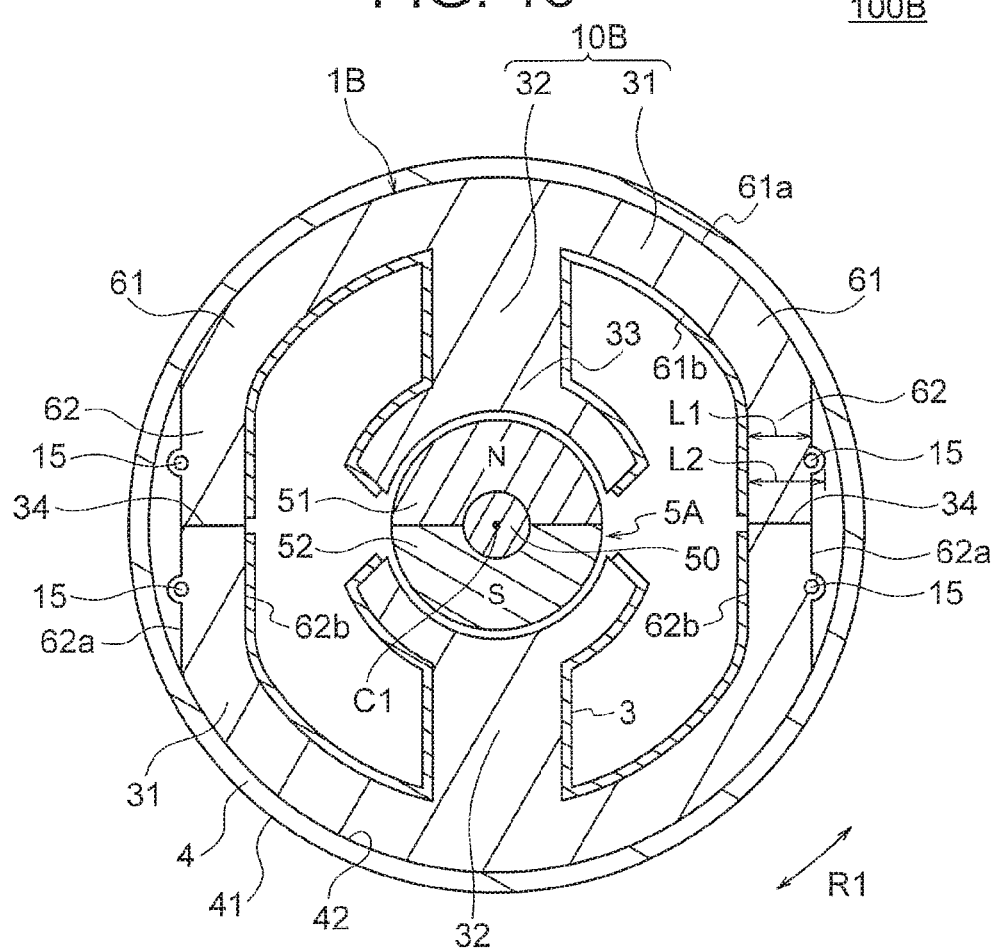
FIG. 15 is a sectional view illustrating a motor according to Embodiment 3.

Embodiment 3 of the present invention will be described next. FIG. 15 is a sectional view illustrating a motor 100B according to Embodiment 3.

The motor 100B according to Embodiment 3 includes a stator 1B and a rotor 5A. The rotor 5A includes a shaft 50, and permanent magnets 51 and 52 attached to the shaft 50. In this example, the rotor 5A includes one permanent magnet 51 and one permanent magnet 52. In other words, the number of magnetic poles of the rotor 5A is two. However, the number of magnetic poles of the rotor 5A is not limited to two. It is sufficient that the number of magnetic poles of the rotor 5A is two or more.

Figure 17:
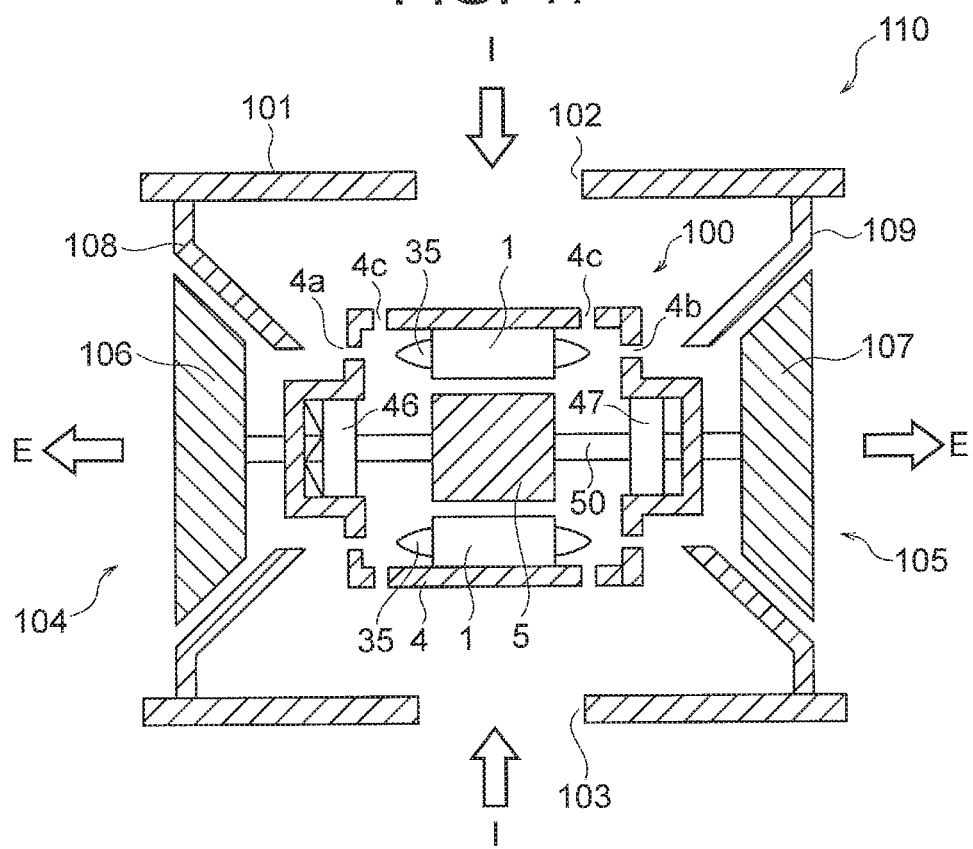
FIG. 17 is a diagram illustrating a configuration example of a fan to which the motor according to each Embodiment is applicable.

The stator 1B includes a stator core 10B, insulating portions 3, and coils (for example, coils 35 illustrated in FIG. 17). The stator core 10B includes a yoke 31, and a plurality of teeth 32 extending from the yoke 31 toward an axis C1. The number of teeth 32 is two in this example. It is sufficient that the number of teeth 32 is two or more.

The yoke 31 includes arc-shaped first yoke portions 61 extending along a circumference of a circle about the axis C1, and second yoke portions 62 extending linearly to form chords of the circumference of the circle. In this example, two first yoke portions 61 and two second yoke portions 62 are alternately arranged in the circumferential direction. However, it is sufficient that each of the number of first yoke portions 61 and the number of second yoke portions 62 is two or more.

Each first yoke portion 61 has an outer circumference 61a located on an outer side in the radial direction, and an inner circumference 61b located on an inner side in the radial direction. The outer circumferences 61a of the first yoke portions 61 are fitted to the cylindrical inner circumference 42 of the shell 4. The teeth 32 extend from the inner circumferences 61b of the first yoke portions 61 toward the rotor 5A. The inner circumferences 61b of the first yoke portions 61 face slots.

Each second yoke portion 62 has an outer circumference 62a located on an outer side in the radial direction, and an inner circumference 62b located on an inner side in the radial direction. The distance from the axis C1 to the outer circumference 62a of the second yoke portion 62 is smaller than the distance from the axis C1 to the outer circumference 61a of the first yoke portion 61. Therefore, the outer circumferences 61a of the first yoke portions 61 abut against the shell 4, while the outer circumferences 62a of the second yoke portions 62 do not abut against the shell 4. The inner circumferences 62b of the second yoke portions 62 face the slots.

Split surfaces 34 are formed at centers of the second yoke portions 62 in the circumferential direction. In this example, two split surfaces 34 are arranged at an interval of 180° with respect to the axis C1. However, it is sufficient that the number of split surfaces 34 is two or more. The stator core 10B is divided into split cores, each for one tooth 32, at the split surfaces 34 formed on the second yoke portions 62.

Crimping portions 15 are formed on the outer circumference 62a of each second yoke portion 62 of the stator core 10B. Two crimping portions 15 are provided on the outer circumference 62a of each second yoke portion 62 so that the two crimping portions 15 sandwich the split surface 34.

When L1 represents the width of the magnetic path formed between the outer circumference 62a and the inner circumference 62b of the second yoke portion 62, and L2 represents the width of the second yoke portion 62 including the crimping portion 15, $L1<L2<2.6\times L1$ is satisfied.

The motor 100B further includes the shell 4 into which the stator core 10B is fitted. The structure of the shell 4 is the same as that of the shell 4 according to Embodiment 1. The outer circumferences 61a of the first yoke portions 61 of the stator core 10B abut against the inner circumference 42 of the shell 4. The outer circumferences 62a of the second yoke portions 62 do not abut against the inner circumference 42 of the shell 4. Therefore, an external force from the shell 4 is not applied to the crimping portions 15.

In this Embodiment 3, the crimping portions 15 project from the outer circumferences 62a of the second yoke portions 62 of the yoke 31, and the width L1 of the magnetic path formed between the outer circumference 62a and the inner circumference 62b of the second yoke portion 62, and the width L2 of the second yoke portion 62 including the crimping portion 15 satisfy $L1<L2<2.6\times L1$. Therefore, the magnetic flux flowing through the magnetic paths is less likely to be influenced by the stress at the crimping portion 15, and the iron loss can thus be reduced.

Since the distance from the axis C1 to the outer circumference 62a of the second yoke portion 62 is smaller than the distance from the axis C1 to the outer circumference 61a of the first yoke portion 61, and the crimping portions 15 are provided on the second yoke portions 62, the stress from the shell 4 is not applied to the crimping portions 15 even when the stator 1B is fitted to the inner circumference 42 of the shell 4. Thus, the influence of the stress on the magnetic flux flowing through the magnetic path can be suppressed. Therefore, the effect of reducing the iron loss can be enhanced.

Embodiment 4

Figure 16:
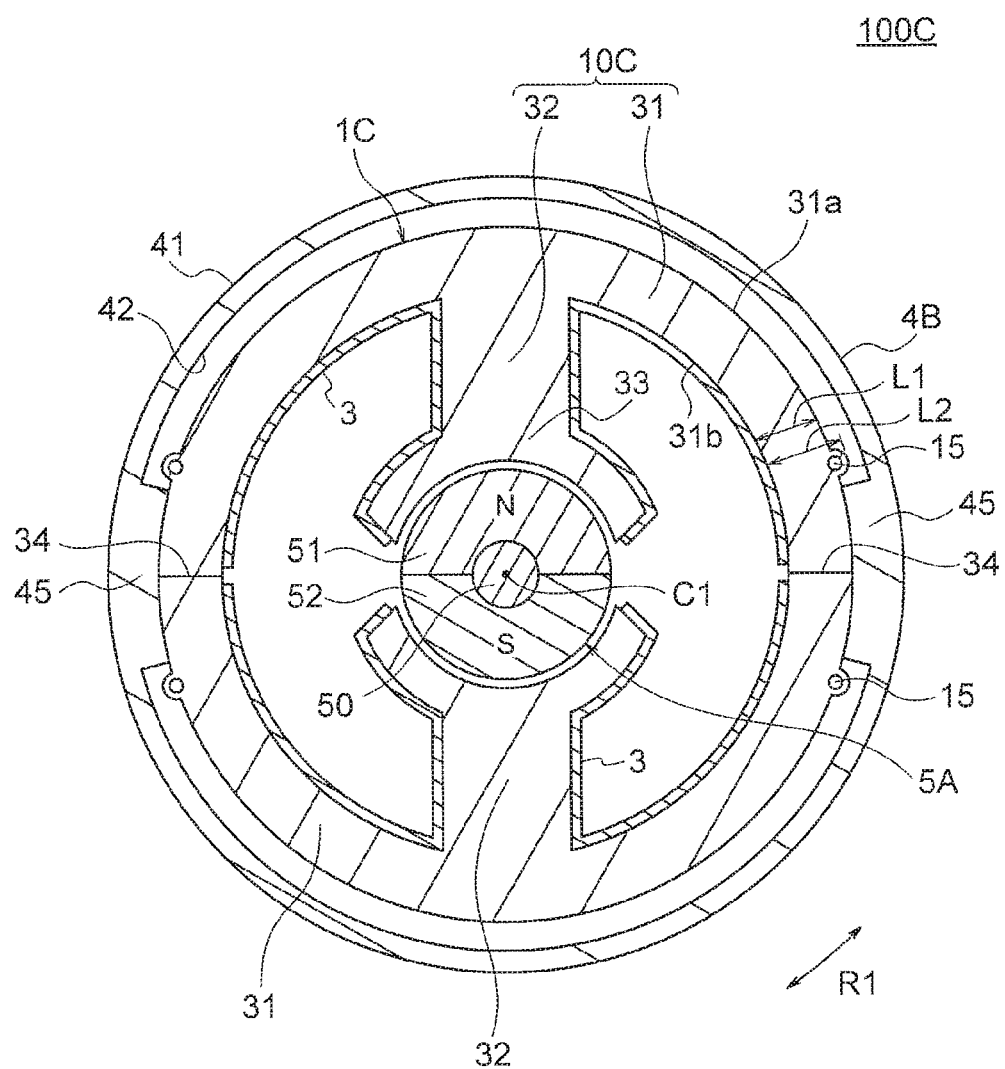
FIG. 16 is a sectional view illustrating a motor according to Embodiment 4.

Embodiment 4 of the present invention will be described next. FIG. 16 is a sectional view illustrating a motor 100C according to Embodiment 4.

The motor 100C according to Embodiment 4 is different from the motor 100B according to Embodiment 3 in the shape of a stator core 10C of a stator 1C. The stator core 10C includes a yoke 31, and a plurality of teeth 32 extending from the yoke 31 toward the axis C1. The number of teeth 32 is two in this example, but it is sufficient that the number of teeth 32 is two or more.

In this Embodiment 4, the entire yoke 31 is formed in an annular shape about the axis C1. Split surfaces 34 are formed on the yoke 31. In this example, two split surfaces 34 are arranged at an interval of 180° with respect to the axis C1. However, it is sufficient that the number of split surfaces 34 is two or more. The stator core 10C is divided into split cores, each for one tooth 32, at the split surfaces 34 formed on the yoke 31.

The yoke 31 has an outer circumference 31a and an inner circumference 31b. Crimping portions 15 are formed on the outer circumference 31a of the yoke 31. Two pairs of crimping portions 15 are provided on the outer circumference 31a of the yoke 31 so that each pair of crimping portions 15 sandwich the split surface 34.

When L1 represents the width of the magnetic path formed between the outer circumference 31a and the inner circumference 31b of the yoke 31, and L2 represents the width of the yoke 31 including the crimping portion 15, $L1<L2<2.6\times L1$ is satisfied.

The motor 100C further includes a shell 4B into which the stator core 10C is fitted. The shell 4B includes two abutting portions 45 projecting from an inner circumference 42 thereof. Each abutting portion 45 abuts against a portion of the outer circumference 31a of the yoke 31 between two crimping portions 15. Other structures of the motor 100C according to Embodiment 4 are the same as those of the motor 100 according to Embodiment 1.

In this Embodiment 4, the crimping portions 15 are provided on the outer circumference 31a of the annular yoke 31, but the abutting portions 45 of the shell 4B abut against portions of the outer circumference 31a of the yoke 31 other than the crimping portions 15. Therefore, the stress from the shell 4B is not applied to the crimping portions 15, and the influence of the stress on the magnetic flux flowing through the magnetic paths can thus be suppressed. Therefore, the effect of reducing the iron loss can be enhanced.

Since the width L1 of the magnetic path formed between the outer circumference 31a and the inner circumference 31b of the yoke 31, and the width L2 of the yoke 31 including the crimping portion 15 satisfy $L1<L2<2.6\times L1$, the effect of reducing the iron loss can be enhanced as in Embodiment 1.

(Fan)

A configuration example of a fan to which each of the motors 100 to 100C according to Embodiments 1 to 4 is applicable will be described next. FIG. 17 is a schematic view illustrating a fan 110 including the motor 100 according to Embodiment 1. The fan 110 includes the motor 100 according to Embodiment 1, impellers 106 and 107 driven by the motor 100, and a housing 101.

The shell 4 covers the stator 1 and the rotor 5 of the motor 100, and is fixed to the housing 101. The shaft 50 of the rotor 5 is rotatably supported by the shell 4 via bearings 46 and 47. The shaft 50 passes through the shell 4 in the axial direction, and the impellers 106 and 107 are fixed to both ends of the shaft 50. The impellers 106 and 107 are, for example, centrifugal blades or turbo blades.

Holes 4a, 4b, and 4c for allowing air to flow in the shell 4 are formed in the shell 4. The holes 4a and 4b pass through the shell 4 in the axial direction, and the holes 4c pass through the shell 4 in the radial direction.

The housing 101 covers the motor 100 and the impellers 106 and 107. The housing 101 includes suction ports 102 and 103 for sucking air into the housing 101, exhaust ports 104 and 105 for exhausting the air out of the housing 101, and fan covers 108 and 109 respectively covering the impellers 106 and 107.

When the rotor 5 rotates by applying current to the coils 35 of the stator 1, the impellers 106 and 107 also rotate together with the shaft 50. With this operation, the impellers 106 and 107 generate an airflow. Thus, air flows into the housing 101 through the suction ports 102 and 103 as indicated by arrows I, and is discharged through the exhaust ports 104 and 105 as indicated by arrows E. Part of the air flowing into the housing 101 passes through the shell 4 via the holes 4a, 4b, and 4c, and cools the motor 100.

The fan 110 uses the motor 100 whose motor efficiency is enhanced by reducing the iron loss, and can therefore achieve high operating efficiency. Any of the motors 100A to 100C according to Embodiments 2 to 4 may be used in place of the motor 100 according to Embodiment 1.

(Vacuum Cleaner)

Figure 18:
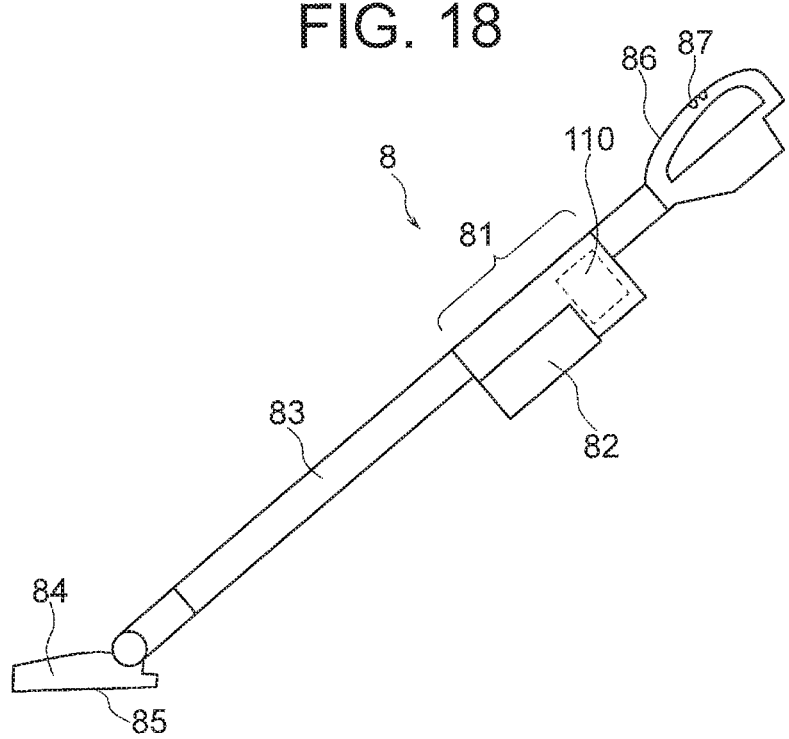
FIG. 18 is a diagram illustrating a vacuum cleaner including a fan to which the motor according to each Embodiment is applicable.

A vacuum cleaner using the fan 110 to which each of the motors 100 to 100C according to Embodiments 1 to 4 is applicable will be described next. FIG. 18 is a schematic view illustrating a vacuum cleaner 8 using the fan 110 (FIG. 17) including the motor 100 according to Embodiment 1.

The vacuum cleaner 8 includes a cleaner main body 81, a pipe 83 connected to the cleaner main body 81, and a suction portion 84 connected to an end of the pipe 83. The suction portion 84 is provided with a suction port 85 for sucking air containing dust. A dust collection container 82 is disposed in the cleaner main body 81.

A fan 110 for sucking air containing dust through the suction port 85 into the dust collection container 82 is disposed in the cleaner main body 81. The fan 110 has, for example, the configuration illustrated in FIG. 17. The cleaner main body 81 is provided with a grip portion 86 to be gripped by a user, and the grip portion 86 is provided with an operation portion 87 such as an ON/OFF switch.

When the user grips the grip portion 86 and operates the operation portion 87, the fan 110 is actuated, and the motor 100 thus rotates. When the fan 110 is actuated, suction air is produced, and dust is sucked together with air through the suction port 85 and the pipe 83. The sucked dust is stored in the dust collection container 82.

The vacuum cleaner 8 uses the fan 110 including the motor 100 whose motor efficiency is enhanced by reducing the iron loss, and can therefore achieve high operating efficiency. Any of the motors 100A to 100C according to Embodiments 2 to 4 may be used in place of the motor 100 according to Embodiment 1.

(Hand Dryer)

Figure 19:
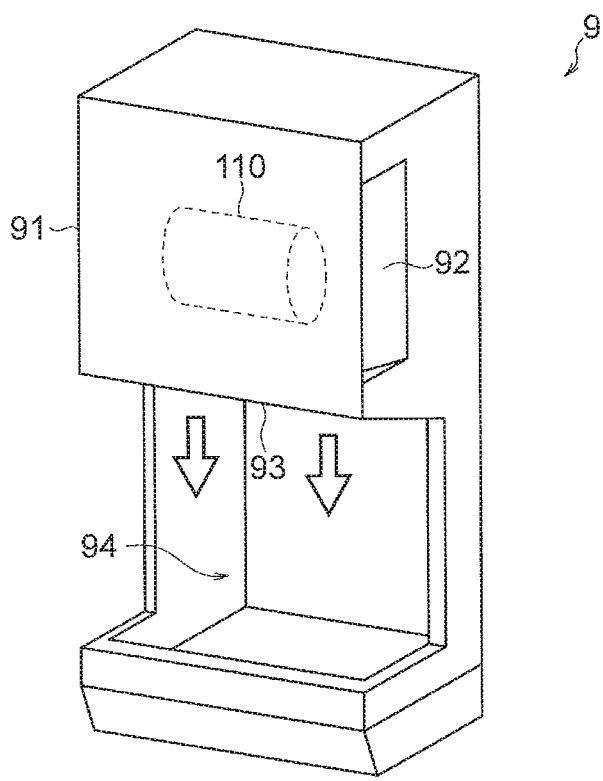
FIG. 19 is a diagram illustrating a hand dryer including a fan to which the motor according to each Embodiment is applicable.

A hand dryer using the fan 110 to which each of the motors 100 to 100C according to Embodiments 1 to 4 is applicable will be described next. FIG. 19 is a schematic view illustrating a hand dryer 9 using the fan 110 (FIG. 17) including the motor 100 according to Embodiment 1.

The hand dryer 9 includes a housing 91, and a fan 110 fixed in the housing 91. The fan 110 has, for example, the configuration illustrated in FIG. 17. The housing 91 includes an air intake 92, an air outlet 93, and a hand insertion portion 94 which is provided below the air outlet 93 and into which hands of a user are to be inserted. The fan 110 generates an airflow to suck air outside the housing 91 through the air intake 92 and to blow the air to the hand insertion portion 94 through the air outlet 93.

When the hand dryer 9 is powered on, power is supplied to the fan 110, and the motor 100 is driven. During driving of the fan 110, air outside the hand dryer 9 is sucked in through the air intake 92 and blown out through the air outlet 93. When the hands of the user are inserted into the hand insertion portion 94, water droplets attached to the hands can be blown off or evaporated by the air blown from the outlet opening 93.

The hand dryer 9 uses the fan 110 including the motor 100 whose motor efficiency is enhanced by reducing the iron loss, and can therefore achieve high operating efficiency. Any of the motors 100A to 100C according to Embodiments 2 to 4 may be used in place of the motor 100 according to Embodiment 1.

While desirable embodiments of the present invention have been described in detail above, the present invention is not limited thereto, and various improvements or modifications may be made without departing from the gist of the present invention.

What is claimed is:

1. A motor comprising:
   a stator comprising a yoke extending to surround an axis, the yoke having a first yoke portion and a second yoke portion arranged in a circumferential direction about the axis,
   a rotor disposed on an inner side of the stator in a radial direction about the axis; and
   a shell in which the yoke of the stator is fixed,
   wherein each of the first yoke portion and the second yoke portion has an outer circumference and an inner circumference,
   wherein the yoke has a crimping portion projecting from the outer circumference of the second yoke portion, and a split surface provided on the first yoke portion or the second yoke portion at a position different from a position of the crimping portion,
   wherein a distance from the axis to the outer circumference of the first yoke portion is greater than a distance from the axis to the outer circumference of the second yoke portion, and
   wherein the outer circumference of the second yoke portion does not abut against the shell.

2. The motor according to claim 1, wherein the first yoke portion extends in an arc shape in the circumferential direction, and
   wherein the second yoke portion extends at an inclination with respect to the circumferential direction from an end of the first yoke portion in the circumferential direction.

3. The motor according to claim 1, further comprising a tooth extending from the yoke toward the axis,
   wherein the crimping portion is disposed between the tooth and the split surface in the circumferential direction about the axis.

4. The motor according to claim 1,
wherein the second yoke portion has a magnetic path between the outer circumference and the inner circumference,
wherein when L1 represents a width of the magnetic path, and L2 represents a width of the second yoke portion including the crimping portion, $$L1<L2<2.6\times L1$$

is satisfied.

5. The motor according to claim 4,
wherein the width L1 is a distance from the inner circumference of the second yoke portion to the outer circumference of the second yoke portion, and
wherein the width L2 is a distance from the inner circumference of the second yoke portion to a most projecting portion of the crimping portion.

6. A fan comprising:
the motor according to claim 1; and
an impeller driven to rotate by the motor.

7. A vacuum cleaner comprising:
a suction portion including a suction port;
a dust collection container to store dust; and
the fan according to claim 6, the fan sucking air containing dust through the suction portion into the dust collection container.

8. A hand dryer comprising:
a housing having an air intake and an air outlet; and
the fan according to claim 6 disposed in the housing, the fan sucking air through the air intake and blowing the air through the air outlet.

9. A motor comprising:
a stator comprising a yoke extending to surround an axis;
a rotor disposed on an inner side of the stator in a radial direction about the axis; and
a shell in which the yoke of the stator is fixed,
wherein the yoke has an outer circumference and an inner circumference, a crimping portion projecting from the outer circumference, and a split surface provided at a position different from a position of the crimping portion,
wherein the shell has an abutting portion that projects toward the outer circumference of the stator and abuts against a portion of the yoke other than the crimping portion.

10. The motor according to claim 9, further comprising a tooth extending from the yoke toward the axis,
wherein the crimping portion is provided between the tooth and the split surface in a circumferential direction about the axis.

11. The motor according to claim 9,
wherein the yoke has a magnetic path between the outer circumference and the inner circumference,
wherein when L1 represents a width of the magnetic path, and L2 represents a width of the yoke including the crimping portion, $$L1<L2<2.6\times L1$$

is satisfied.

12. The motor according to claim 9, wherein the width L1 is a distance from the inner circumference of the yoke to the outer circumference of the yoke, and
wherein the width L2 is a distance from the inner circumference of the yoke to a most projecting portion of the crimping portion.

13. The motor according to claim 9, wherein the yoke comprises a first yoke portion and a second yoke portion arranged in a circumferential direction about the axis,
wherein each of the first yoke portion and the second yoke portion has an outer circumference and an inner circumference,
wherein a distance from the axis to the outer circumference of the first yoke portion is greater than a distance from the axis to the outer circumference of the second yoke portion, and
wherein the crimping portion is formed on the first yoke portion.

* * * * *